R. B. FAGEOL.
AUTOMOBILE BUMPER.
APPLICATION FILED DEC. 14, 1912.
1,266,240.
Patented May 14, 1918.
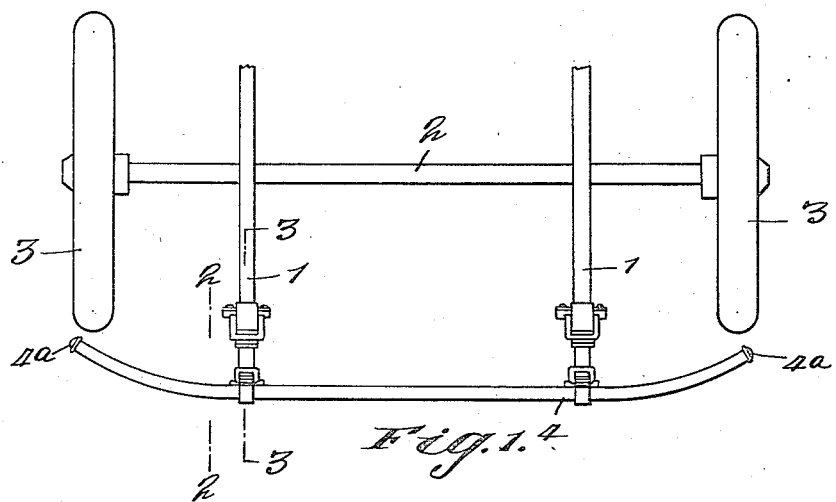
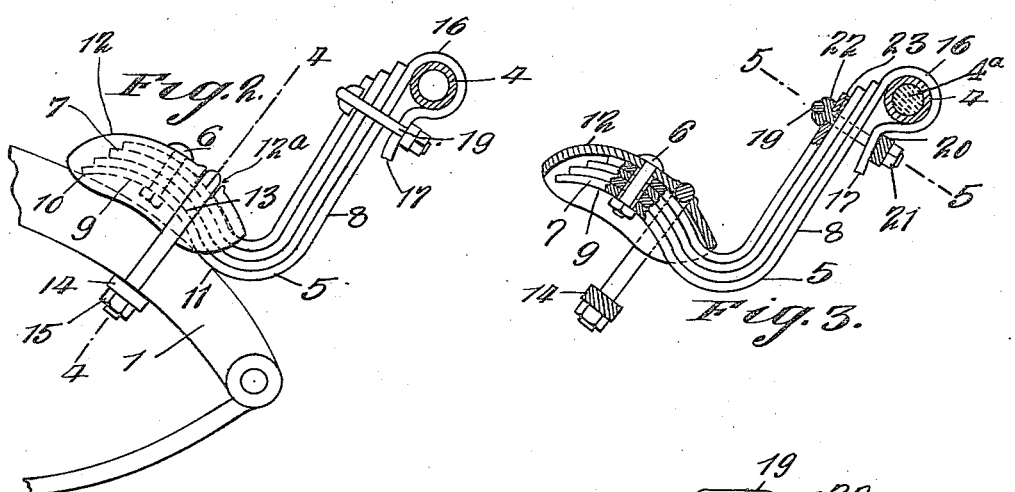
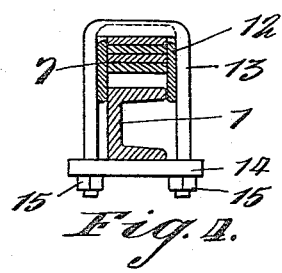
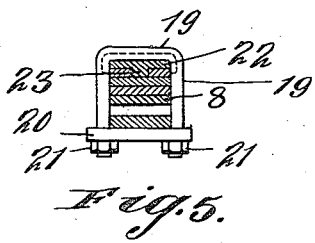
WITNESSES
Wm. C. Dunn
Lillian Malzer.
INVENTOR
Rollie Belle Fageol,
BY
Clifford E. Dunn.
ATTORNEY

UNITED STATES PATENT OFFICE.

ROLLIE BELLE FAGEOL, OF NEW YORK, N. Y.

AUTOMOBILE-BUMPER.

1,266,240.    Specification of Letters Patent.    Patented May 14, 1918.

Application filed December 14, 1912. Serial No. 736,669.

*To all whom it may concern:*

Be it known that I, ROLLIE BELLE FAGEOL, a citizen of the United States, residing in the city of New York, borough of Manhattan, county and State of New York, have invented certain new and useful Improvements in Automobile-Bumpers, of which the following is a specification.

An object of my present invention is to provide a buffer or bumper for vehicles which may be readily attached to the vehicles without requiring boring or otherwise altering the construction of that portion of the vehicle to which the same is to be applied.

A further object is to provide a buffer which is capable of withstanding and resisting severe and suddenly-experienced jolts due to collisions, etc., whereby the reactive force created by the impact will be absorbed and assumed by the buffer, thereby affording effective protection to all portions of the vehicle.

While my invention is specially applicable to automobiles for the protection of those exposed parts which are of necessarily delicate construction, such as lamps, wheel guards, radiators, and the like, it may likewise be applied to and used in connection with any form of vehicle to corresponding advantage.

A further object of my invention is to provide various novel features of construction applicable to buffers or bumpers for different types of automobiles and in which simplicity of construction is combined with efficiency and durability in service, all of which will be apparent and readily understood from the following description.

I will now proceed to describe my invention with reference to the accompanying drawings and then point out more particularly the elements of novelty therein, in the annexed claims.

In the drawings,

Figure 1 is a plan view of a portion of the front end of an automobile having my improved buffer attached thereto.

Fig. 2 is a section on line 2—2 of Fig. 1, showing one of the elbow springs supporting the buffer or bumper bar and attached to one of the side-frames of an automobile.

Fig. 3 is a section on line 3—3 of Fig. 1.

Fig. 4 is a section on line 4—4 of Fig. 2.

Fig. 5 is a section on line 5—5 of Fig. 2.

Referring now to the drawings in detail, wherein like characters of reference are employed to designate similar parts throughout the several views, 1—1 are the side bars of the frame of an automobile or other vehicle to which my invention is applicable, the numeral 2 indicating the forward axle and 3, the wheels. The side bars 1—1, extend longitudinally of the automobile and the ends thereof are supported by the usual springs, which in turn are carried by the axle in the well-known manner. 4, designates a buffer-bar having a straight central portion and rearwardly directed curved ends preferably provided with the rounded or semi-spherical caps 4$^A$, which serve to prevent injury to the tires of the vehicle, if, when in use, the buffer-bar is forced or driven into contact therewith. This buffer-bar 4 may be made of any suitable metal either of hollow or solid construction; but I have found it desirable in carrying my invention into effect to employ a bar of the hollow or tubular type, reinforced with some suitable material such as cement or the like, as indicated at 4$^a$ in Fig. 3. The buffer bar 4 extends horizontally across the front of the automobile and is supported and held in proper position relatively to the machine to afford the protection for which it is designed and is supported by the elbow-spring-supporting-members 5, which are detachably secured to the side-bar of the chassis, as will be hereinafter more fully described. Inasmuch as the two elbow springs are identical in construction and their manner of attachment the same, it is thought that a detailed explanation of one will suffice for a clear understanding of the invention.

Each of these elbow-spring-supporting members is attached to a side-bar of the chassis at one end and to the buffer or bumper-bar at the opposite end. In detail, the elbow-spring-member is of a built-up construction and preferably formed of a plurality of laminated leaf-spring members or superimposed sections, the relative length of the leaves or sections decreasing toward the uppermost superimposed leaf member. These leaves or sections are held together by suitable clamping means such as a bolt 6, and when assembled form a unitary spring member which inherently possesses great resistance to bending due to the creation of friction between the independent leaves, in addition to the spring resistance offered by the leaves themselves. The extremity of the elbow laminated spring, indicated by the numeral 7, serves as an attaching arm, while the opposite angularly-disposed extremity 8, serves as a buffer-bar-supporting-arm. The attaching arm is arched at 9, so that the attached arm bears upon the supporting side-frame of the chassis at two points, 10 and 11, (Fig. 2). In order to effect a secure mounting of the supporting arm on the side-frame of the chassis, a pressed steel cap or shoe indicated by the numeral 12, is employed for inclosing the supporting arm 7, this shoe being secured and fastened to the spring laminations by the bolt 6, which extends through the openings in the leaf sections as heretofore described. The opening through which this securing bolt 6 passes is of somewhat larger diameter than the bolt, so that relative longitudinal movement between the independent leaf sections is permitted, and thus a perfectly secure attachment of the device to the frame of the machine may be obtained. The cap of the shoe 12 is provided with a slot 12ᴬ for the reception of a yoke-clamp or U-shaped securing bolt 13, which straddles the shoe 12 and the side-bar of the chassis 1, the employment of a suitable cross-bar 14 and securing nuts 15, providing suitable means for fastening the elbow spring in place on the vehicle. The U-shaped securing bolt or yoke engages the top or uppermost leaf or spring section intermediate the points of contact or support 10 and 11, of the supporting arm, so that by tightening the nuts 15, the arched supporting member is proportionately straightened out thereby holding the elbow spring under tension, and adding security and rigidity to the connection and causing the elbow spring to grip the side-bar in the manner that a pipe wrench grips a pipe. To positively prevent rearward slippage or movement of the arm 7 upon the buffer bar receiving an impact which would tend to drive it upwardly and backwardly against the tension of the laminated spring, I have found it desirable, in locating the yoke 13 intermediate of the bearing points 10 and 11, to place the same forwardly of the crown of the arch 9, that is, adjacent to the bearing point 11 so that as the buffer rises under the force of impact which might have a tendency to lessen the gripping power of the bearing point 11, the gripping force of the bearing point 10 will correspondingly increase. It will be observed that this secure connection which, owing to the arch, is always under tension, serves to hold the securing nuts 15 tight while the shoe 12, straddling the side-bar 1, prevents lateral displacement of the elbow spring.

The lowermost lamination of the elbow spring is elongated and terminates in an eye or loop 16, designed to embrace and engage the buffer or bumper bar 4. The extreme end 17 of this lowermost leaf extends substantially parallel with the leaf springs or laminations and means are provided for clamping it to the leaves in order to tighten the grip of the loop on the buffer bar, as will hereinafter be apparent. The upper extremities of the other spring leaves or laminations terminate as shown, one short of the other in the graduated sections illustrated. The U-shaped or yoke-clamp 19 it will be seen embraces the various leaves or laminations of the spring construction as well as the free end or extremity 17 of the loop. By means of this U-shaped yoke 19, cross-bar 20, and the adjusting or tightening nuts 21, the buffer bar 4 is caused to be firmly gripped by and held in position within the loop or eye 16. A shoe 22, having a depending lug or projection 23, extending into an opening in the uppermost leaf lamination is provided, this lug preventing independent longitudinal movement of the parts. The U-shaped yoke or securing bolt 19 straddles the shoe 21 and the laminated spring construction and serves to hold these parts in their assembled relation.

By the laminated spring construction I have devised a positive and effective means for absorbing and cushioning the force of the impact incident to an object being struck by the buffer or bumper bar. It will be apparent that a force directed against the bumper bar will meet with a somewhat yielding resistance. The resistant power of the spring construction itself is augmented or supplemented by the sliding friction created between the independent laminations, and this resisting friction increases proportionately to the force that is applied to the bumper to move it rearwardly. As the bumper bar is moved rearwardly the spring laminations yield, each lamination slipping or sliding one against the other, and each with a different length of movement. The uppermost leaf or lamination being the shortest and having the longest movement, carries the U-shaped bolt or yoke and draws against the free end of the extremity of the loop lamination, causing the latter to clamp the buffer bar more tightly and also serving to increase the friction between the various laminations, thereby adding to its stiffness and power to resist applied force, until the full resisting strength of all of the spring laminations is overcome, when they all move back or return to their normal position as a solid piece. The bend in the elbow spring 5, which connects the arms or extensions thereof 7 and 8, together with the clamping means 13, serves to prevent the leaf sections or laminations at the bottom of the part 8 from moving relatively to each other when the upper extremities of the leaf sections or laminations are caused to slide upon each other as they are forced back. Furthermore, by providing a laminated spring construction of the elbow type, a shock-absorbing and protecting means is secured which is adapted to withstand the impact of an object without injuring the spring, owing to its ability to give, whether the object abutted be a moving object in an up-and-down direction, such as a wheel of a moving vehicle, or one that is stationary and a buffer is provided which possesses great strength and ability to withstand severe impacts.

It will be observed that the elbow spring and the means of attachment shown may be easily positioned at the most convenient part of the side-frame of the chassis, and owing to the adjustable clamping means, the position may be altered should it be found desirable. The parts comprising the elbow spring and the attaching means are of extreme simplicity in design and construction and are consequently inexpensive in cost of production.

While I have herein shown and described my invention in a desirable and practicable form, I desire it to be understood that I do not limit myself to this particular construction as the same may be greatly modified without departing from the spirit and scope of my invention.

Having thus described my invention, what I claim as new herein and desire to secure by Letters Patent is:

1. A buffer for vehicles comprising a substantially L-shaped spring member formed of a plurality of laminations in frictional contact with each other, a buffer bar, means for adjustably connecting the buffer bar to one extremity of the spring member, and means for connecting the other extremity of the spring member to the vehicle under tension.

2. A buffer for vehicles comprising an elbow laminated spring, means for attaching one extremity of said spring to a vehicle part under tension, and adjustable means at the other extremity thereof for connecting a buffer bar thereto.

3. In combination with a vehicle, a bumper comprising a pair of elbow springs of laminated construction, each elbow spring being provided with one arm rigidly connected to the vehicle under tension, the other arm being rearwardly yieldable under the action of applied force, the movement of the respective laminations of the yieldable arm frictionally retarding each other when moved, and a horizontal cross-bar attached to and connecting the forward ends of said springs.

4. The combination with the side-bars of an automobile frame, of a bumper bar, means connecting said bumper-bar to one of said side-bars, a spring formed of a plurality of leaf sections in frictional engagement with each other, and means for connecting said spring to the other of said side-bars, one of said sections having a loop formed therein embracing said bumper bar.

5. The combination with the side-bars of an automobile frame, of a bumper bar, means connecting said bumper bar to one of said side-bars, a spring formed of a plurality of leaf sections engaged with each other, means for connecting said spring to the other of said side-bars, one of said sections having a loop formed therein embracing said bumper-bar, means for drawing the sides of said loop together and clamping said bumper bar therein, the last-named means guiding said sections at one portion of the spring and permitting them to move relatively to each other under pressure, and means for preventing relative movement between said sections at another portion of the spring.

6. The combination with the side-bars of an automobile frame, of a bumper bar, means connecting said bumper bar to one of said side-bars, a spring extending forwardly and upwardly from a position adjacent the other of said side-bars, said spring being formed of a plurality of leaf sections free to slide against each other at one portion of the spring, means for connecting the lower portion of said spring to the adjacent side-bar, and means for connecting the upper portion of said spring to said bumper bar.

7. The combination with the side-bars of an automobile frame, of a bumper bar, means connecting said bumper bar to one of said side-bars, a spring formed of a plurality of leaf sections engaged with each other, said sections being free to slide against each other at one portion of the spring, means for securing said sections together at another portion of the spring, means for connecting said spring to the other of said side bars under tension, and means for connecting said spring to said bumper bar.

8. In combination with a vehicle, a bumper comprising a pair of springs of laminated construction, each formed to provide a long arm and a shorter arm, the shorter arm being adapted for attachment to the vehicle, and the laminations of the longer arm being in sliding frictional contact, whereby, upon the application of pressure to said arm, said laminations will move upon each other and exert a gradually increasing resistance in the yielding of said arm to the pressure applied thereto, and a horizontal bar attached to and connecting said yieldable arms.

9. The combination with the side bars of an automobile frame, of a bumper bar, means for connecting said bumper bar to one of said side bars, a spring formed of a plurality of leaf sections engaged with each other, said spring having a bend formed in the sections thereof and extending from said bend to said bumper bar and also extending from said bend to a position adjacent the other of said side bars, means for connecting said spring to said bumper bar, and means for connecting said spring to the adjacent side bar, said leaf sections being free to slide against each other at one part of the spring.

10. The combination with the side bars of an automobile frame, of a bumper bar, means for connecting said bumper bar to one of said side bars, a spring formed of a plurality of leaf sections engaged with each other, said spring having a bend formed in the sections thereof and extending from said bend to said bumper bar and also extending from said bend to a position adjacent the other of said side bars, means for connecting said spring to said bumper bar, and means for connecting the forward leaf section of said spring to said bumper bar, leaving the adjacent leaf section free to slide against the back of the section connected to the bumper bar.

11. The combination with the side bars of an automobile frame, of a bumper bar, means connecting said bumper bar to one of said side bars, a spring formed of a plurality of leaf sections engaged with each other, means for connecting said spring to the other of said side bars, means for connecting said spring to said bumper bar, means for preventing movement between said sections at one portion of the spring, and means for maintaining said sections in frictional contact with each other at another portion of the spring.

12. In combination with a vehicle, a bumper comprising a pair of elbow springs of laminated construction, each elbow spring being provided with one arm rigidly connected to the vehicle, and having two spaced points of contact therewith, the other arm being rearwardly yieldable under the action of applied force, the movement of the respective laminations of the yieldable arm frictionally retarding each other when moved, and a horizontal cross-bar attached to and connecting the forward ends of said springs.

13. A buffer for vehicles, comprising a surface of impact, a frictionally yielding support having means for engaging said surface at one end, the other end of said support being below the horizontal plane of said surface, and means for securing said latter end of said support to the vehicle under tension.

14. In combination with the side-frames of an automobile, a bumper comprising a support projecting forwardly and upwardly from the forward end of each side-frame, each support consisting of a continuous strip of resilient metal comprising a base-portion resting on the upper surface of the side-frame and having two spaced points of contact therewith, and a forward portion arranged so as to be rearwardly yieldable, a clip for securing the base-portion to the side-frame, and a horizontal cross-bar attached to and connecting the forward extremities of said supports.

15. In combination with the side frames of a vehicle a bumper comprising a support formed of a plurality of laminations in frictional contact projecting forwardly and upwardly from the forward end of each side frame, each support consisting of a base portion adapted to rest upon the side frame, and a forward portion arranged so as to yield rearwardly with a gradually increasing resistance, means for securing the base portion to the side frame and a buffer bar attached to and connecting the forward extremities of said supports.

16. In combination with the side frames of an automobile, a bumper comprising a support embodying a plurality of laminations in frictional contact, said laminations being formed to provide a base portion adapted to engage with one of said side frames, means for securing said base portion to said side frame under tension and a buffer bar secured to the other extension of said support.

17. A buffer for vehicles, having a surface for receiving an impact, and a support therefor arranged to yield with a gradually increasing resistance, said support being formed to provide a base portion and a supporting arm, and embodying a plurality of laminations in frictional contact, the base portion of said support being adapted to be rigidly secured to a vehicle part under tension, the portions of the laminations forming the supporting arm being capable of a sliding movement relatively to each other under pressure applied to said surface of impact.

18. A buffer for vehicles, having a surface for receiving an impact and means for absorbing the force of the impact delivered thereto, said means consisting of a yieldable support formed of laminations arranged to yield with a gradually increasing resistance under pressure, one portion of said support being adapted to be rigidly secured to a vehicle part under tension.

In witness whereof I have hereunto set my hand in the presence of two subscribing witnesses.

ROLLIE BELLE FAGEOL.

Witnesses:
P. FRANK SOMMER,
WM. C. DUNN.